US010529185B2

(12) United States Patent
Oguchi et al.

(10) Patent No.: US 10,529,185 B2
(45) Date of Patent: Jan. 7, 2020

(54) MANAGEMENT SYSTEM AND GAMING TABLE

(71) Applicant: SEGA SAMMY CREATION INC., Yokohama-shi, Kanagawa (JP)

(72) Inventors: Hisao Oguchi, Tokyo (JP); Takashi Maekawa, Tokyo (JP)

(73) Assignee: SEGA SAMMY CREATION INC., Yokohama-shi, Kanagawa (JP)

( * ) Notice: Subject to any disclaimer, the term of this patent is extended or adjusted under 35 U.S.C. 154(b) by 0 days.

(21) Appl. No.: 16/093,244

(22) PCT Filed: May 24, 2016

(86) PCT No.: PCT/JP2016/065315
§ 371 (c)(1),
(2) Date: Oct. 12, 2018

(87) PCT Pub. No.: WO2017/203604
PCT Pub. Date: Nov. 30, 2017

(65) Prior Publication Data
US 2019/0130700 A1    May 2, 2019

(51) Int. Cl.
*G07F 17/32* (2006.01)
*G06Q 20/40* (2012.01)
*G06Q 20/26* (2012.01)
*G06Q 20/36* (2012.01)

(52) U.S. Cl.
CPC ......... *G07F 17/3244* (2013.01); *G06Q 20/26* (2013.01); *G06Q 20/363* (2013.01); *G06Q 20/4033* (2013.01); *G07F 17/322* (2013.01); *G07F 17/3248* (2013.01)

(58) Field of Classification Search
CPC ............. G07F 17/3244; G07F 17/3248; G07F 17/322; G06Q 20/363
See application file for complete search history.

(56) References Cited

U.S. PATENT DOCUMENTS

| 2007/0060311 | A1* | 3/2007 | Rowe ...................... A44C 21/00 463/25 |
| 2008/0113771 | A1* | 5/2008 | Baerlocher ............. G07F 17/32 463/25 |
| 2008/0300047 | A1 | 12/2008 | Nagano |
| 2013/0316797 | A1 | 11/2013 | Gelinotte et al. |

FOREIGN PATENT DOCUMENTS

| JP | S58-115578 A | 7/1983 |
| JP | S63-216168 A | 9/1988 |
| JP | 2008-299491 A | 12/2008 |
| JP | 2015-135687 A | 7/2015 |
| JP | 2015-525391 A | 9/2015 |
| WO | 2013/133414 A1 | 12/2013 |

* cited by examiner

*Primary Examiner* — Kevin Y Kim
(74) *Attorney, Agent, or Firm* — Drinker Biddle & Reath LLP

(57) ABSTRACT

A management system and a gaming table. A server associates credits for each user with unique identification information and stores the credits. The server also performs controls by outputting an error if the following do not match: the amount indicated by chip information for a chip present in a predetermined sector; and the amount to be added to or subtracted from the credits that are associated and stored with the identification information.

10 Claims, 10 Drawing Sheets

Fig. 4

| Credit Management Database ||
|---|---|
| Identification Number | Credit ($) |
| U1234 | 150 |
| U1235 | 200 |
| U1236 | 175 |
| U1237 | 525 |
| U1238 | 1253 |
| ---- | ---- |

Fig. 5

| Progress Management Database | | | | | |
|---|---|---|---|---|---|
| Table ID | Sector | ID Info | Bet Amount | Bet Placement | Amount to be Updated |
| T11 | 1 | U1492 | 10 | BANKER | −10 |
|  | 2 | U1032 | 20 | PLAYER | 20 |
|  | 3 | U0321 | 100 | BANKER | −100 |
|  | 4 | U4214 | 10 | TIE | 0 |
|  | ⋯ | ⋯ | ⋯ | ⋯ | ⋯ |
| ⋯ | ⋯ | ⋯ | ⋯ | ⋯ | ⋯ |
|  | ⋯ | ⋯ | ⋯ | ⋯ | ⋯ |

MANAGEMENT SYSTEM AND GAMING TABLE

CROSS-REFERENCE TO RELATED APPLICATIONS

This application is the U.S. national phase of the International Patent Application No. PCT/JP2016/065315 filed May 24, 2016, the entire content of which is incorporated herein by reference.

TECHNICAL FIELD

The present disclosure is a technology related to a management system used at casinos and other gaming establishments. More specifically, the present disclosure is a technology related to a management system for changing the role of chips in situations where chips are paid out by a dealer to a participant in a game (referred to below as a user).

BACKGROUND ART

Card games such as baccarat and blackjack are commonly played at casinos and other gaming establishments. In these card games, users participate by placing bets using chips. When a user wins a game, the dealer pays out chips to the user based on the results. In other words, there is an exchange of chips between the dealer and the user. These chips are converted to cash or prizes at a window by a person known as a cashier. In this way, the chips serve as a substitute currency at a gaming establishment.

In Japanese Patent Publication JP 2015-525391 A, a technology is disclosed in which a RFID is embedded in each chip and chips are managed using RFIDs. Because this technique also determines the authenticity of chips, it can also prevent the improper use of counterfeit chips by users.

SUMMARY

While the technology described in Japanese Patent Publication JP 2015-525391 A can determine the authenticity of chips, it cannot prevent the pay out of chips with the wrong amounts to users due to dealer mistakes or inadvertent actions.

One aspect of the present disclosure is a management system comprising: a server for managing user credits; an identification information reading unit for reading user identification information and sending the information to the server; and a chip reading unit for reading chip information on chips present in a predetermined sector and sending the information to the server; wherein: the server comprises a memory unit for associating user credit with unique identification information and storing the associated information, and a control unit for performing error output controls when the sum indicated in the credit information does not match the sum to be added to or subtracted from stored credit associated with the identification information.

The present disclosure can prevent the pay out of chips with wrong amounts to users due to dealer mistakes or inadvertent actions while preserving the thrill of playing games at casinos and other gaming establishments.

BRIEF DESCRIPTION OF DRAWINGS

Various embodiments of the disclosure are illustrated in the drawings, in which:

FIG. 4 is a table showing an example of a credit management database for the server in the embodiment.

FIG. 5 is a table showing an example of a progress management database for the server in the embodiment.

DETAILED DESCRIPTION

Figure 1:
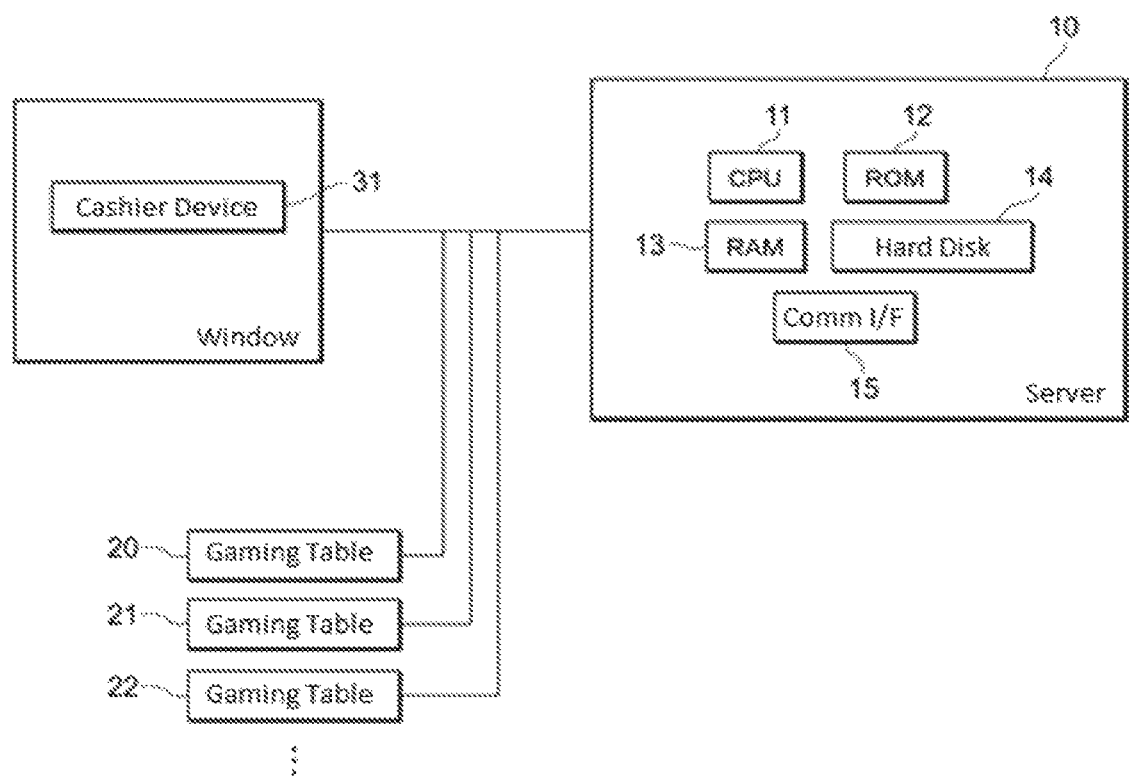
FIG. 1 is a diagram showing an example of a configuration for the management system in the embodiment.

The following is a detailed description of embodiments of the present disclosure with reference to the drawings. The configurations explained in the embodiments are for illustrative purposes only and the present disclosure is not limited to the illustrated configurations.

Explanation of Terminology

The following are the definitions for some of the terminology used in the present specification.

Gaming Table: This refers to a table on which various games are played at a gaming establishment. There is usually a single dealer at each table. Also, a plurality of users usually participate in a game at the same time at each table.

Dealer: This refers to a person working for the gaming establishment who distributes the cards and pays out chips based on the winnings.

User: This refers to a guest at the gaming establishment who participates in the games.

Baccarat: This refers to a traditional card game played by a "banker" and a "player" in which the user bets on whether he or she will win or lose the game. The user only guesses whether he or she will win or lose the game. It is an easy card game which is very popular at casinos around the world. Following certain rules, the dealer distributes two or three playing cards to the banker and the players. Hands are totaled by the rightmost digit and the hand closest to "9" wins.

Blackjack: A game in which the user's aim is to obtain more points from cards than the dealer without the total exceeding 21.

Chip: A substitute currency used in games.

Bet: Placement of chips reflecting the expectations of the user. In baccarat, bets are placed based on whether the user expects the banker to win, the player to win, or a tie to occur. In blackjack, the user assesses the likelihood that he or she will win and places a bet accordingly.

Bet Amount: The amount used during a bet. Each user sets the amount on his or her own. When a user wins, a payout is received based on the bet amount.

Betting Area: An area where the bet amounts are on display after users have placed their chips there. In other words, it's the area where users place their bets with chips. In baccarat, the areas on the table are for placing bets that the banker will win, the player will win, or the game will result in a tie.

Credit: The balance held by the user. Credit increases when a user receives a payout and decreases when the game goes against the user's expectations.

Preventing Payout of Chips with Wrong Amounts

As mentioned above, chips used at a gaming establishment can be exchanged at the cashier for prizes and sometimes for cash. Therefore, the payout of chips with the wrong amounts due to mistakes by dealers or inadvertent actions has to be prevented.

One way to prevent this is to install surveillance cameras. Monitoring the behavior of dealers with surveillance cameras provides a certain amount of deterrence. However, when the actual amount of chips is lower than the expected amount, video from surveillance cameras has to be reviewed by the manager of the gaming establishment and this entails a great deal of effort.

Another way to prevent this would be to abolish the chip system itself. Some have considered abolishing the exchange of chips between the dealer and the user and instead managing credit electronically. For example, slot machines at gaming establishments often manage credit electronically using cards with barcodes instead of chips. A user whose barcode has been read and whose credit has been registered to a machine can then place bets on a screen (using a touch panel, etc.). The credit managed electronically is then increased or decreased based on the results of the bet. If the chip system itself were abolished in the way it has been done with slot machines, then chips with wrong amounts would not be paid out when chips are awarded to a user by the dealer. However, if the chip system were abolished, some of the thrill of playing games at a casino or other gaming establishment would be lost.

The Thrill of Playing Games at Casinos or Other Gaming Establishments

The following is an explanation of the thrill of playing games at a casino or some other gaming establishment. Increasingly, games are no longer played in person. Instead, games are played against a dealer on a screen at, for example, an online casino.

However, the thrill of playing at a casino or similar gaming establishment is actually playing against someone in person (the dealer) and exchanging real chips. The rapport cultivated between the dealer and the user, the communication, and the atmosphere at a table surrounded by other users is vital to the user experience. The experience of playing a game with an actual person (the dealer) at a real location is said to be part of the thrill of playing at a casino or other gaming establishment. Card games in which there is an actual exchange of chips between a dealer and a user are popular at casinos and other gaming establishments.

In the embodiment described below, a system is realized in which an exchange of chips with wrong amounts can be prevented when the dealer pays out chips to a user while preserving the thrill of playing games at a casino or other gaming establishment.

As explained above, chips are used to participate in games at a casino or other gaming establishment and the chips themselves have value as a substitute currency. In the embodiment described below, chips are used to participate in games but the chips themselves do not have any value as a substitute currency. Specifically, user credit is managed electronically apart from chips. The chips paid out by a dealer to a user are read and compared to the credit being managed electronically. When the results of the comparison indicate that the wrong chip has been paid out, an error is outputted. In this system, the sum of the chips held by the user is matched with the credit being managed electronically.

When the user exchanges chips for cash or prizes, the cash or prizes are paid out not using the chips physically held by the user but using the credit managed electronically. In other words, the chips themselves have no value as a substitute currency.

Because the credit managed electronically plays the role of the substitute currency in this system, the chips themselves have no value as a substitute currency. Therefore, even when a chip with the wrong amount is inadvertently paid out to a user by a dealer, the action has no real significance. However, chips continue to play a role as the means by which users participate in a game. Therefore, users participating in a game use chips to place bets and receive chips in the form of payouts from dealers when they win. As a result, users continue to experience the thrill of participating in games at casinos and other gaming establishments in the same manner as before.

Embodiment 1

System Configuration

There are many different kinds of games at gaming establishments, but the present embodiment will be explained using a game in which the dealer and a user exchange chips. In this kind of game, the dealer and the user face each other across a gaming table.

FIG. 1 is a block diagram showing the system configuration for the management system used in a casino or other gaming establishment in the first embodiment. The management system shown in FIG. 1 comprises a server 10, gaming tables 20, 21, 22, etc., and a cashier device 31 arranged in a window at the gaming establishment. There are many gaming tables in the example, but a single gaming table will be described. The gaming table 20 described below is an example of a configuration for a gaming table, and the following explanation can be applied in the same way to other gaming tables.

A wired or wireless connection is established between the server 10, the gaming table 20, and the cashier device 31 to exchange information. While not depicted in the drawings, a relay device such as router may be installed between the server 10, the gaming table 20, and the cashier device 31. The server 10 may be located inside of the gaming establishment or outside of the gaming establishment. The gaming table 20, the server 10, and the cashier device 31 may also be connected to each other via the internet.

Server Configuration

The server has a CPU 11, ROM 12, RAM 13, a hard disk 14, and a communication interface (I/F) 15. The CPU 11 controls the server 10 in accordance with the control programs stored in the ROM 12 and on the hard disk 14. Control programs are stored on the ROM 12. The RAM 13 is used to temporarily store data and programs. The hard disk 14 stores data and programs. The hard disk 14 also comprises data tables in which the various types of information described below have been associated with each other. For example, the hard disk 14 contains a management database (DB) in which user credit has been associated with unique identification information. This identification information is included on an identification card in the possession of the user. Therefore, the identification data could be said to be information used to identify a user. The credit management database will be explained below in greater detail.

Description of the Window

A cashier device 31 is provided in a window. The window is a window at the gaming establishment used to convert the substitute currency used at the gaming establishment into actual currency and vice versa. In the present embodiment, each user at the gaming establishment has an identification card. This identification card is created when a user enters the gaming establishment and is created using an application filled out beforehand. The user can add credit associated with the identification information on the identification card by entering cash at the window. During a payout, a staff member at the window uses a card reader installed at the window to read the user's identification card and obtain identification information for the cashier device 31. The cashier device 31 uses the acquired identification information to call up the credit from the server 10 and determine the payout to the user.

Description of the Gaming Table

Figure 2:
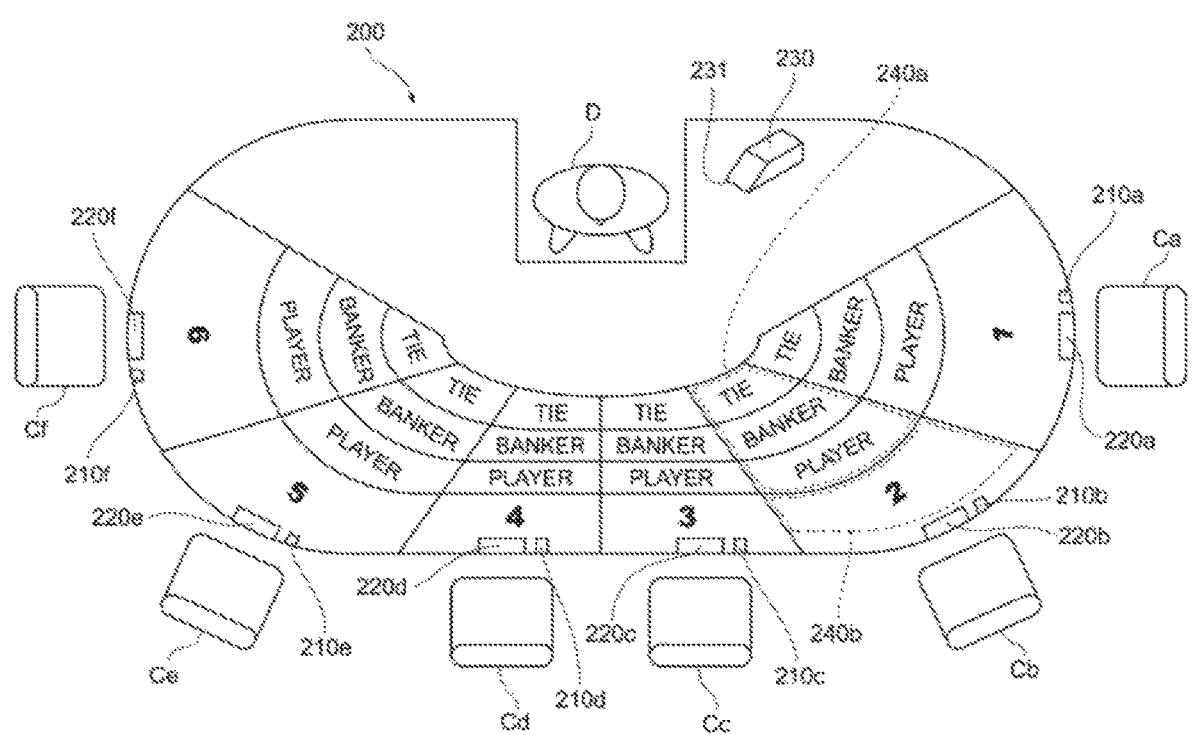
FIG. 2 is a schematic diagram showing an example of a gaming table in the embodiment.

FIG. 2 is a diagram showing an example of a gaming table 20. This gaming table is divided into sectors (sectors 1-6), and users participating in the game sit at seats Ca—Cf in each sector. The gaming table shown in FIG. 2 has six sectors for users participating in the game. The present disclosure is not limited to this example and each table can be divided into a different number of sectors. In the following example, the gaming table 20 in FIG. 2 is used to play baccarat. However, the table design and content used here are for illustrative purposes only. The present disclosure can be used at many different kinds of tables. The following is a description of each component installed at the gaming table 20.

Description of the Identification Information Reading Unit

An identification information reading unit 210*a*-210*f* for reading user identification information is installed in each sector of the gaming table 20. In the present embodiment, the users possess an identification card. This card can be any type of identification card, such as a magnetic card, a card with an embedded IC chip, or a card with an embedded RFID. The identification information reading units 210*a*-210*f* are configured as reading units for the specific type of card being used. The identification information does not have to be data obtained from a storage medium such as a card. It can be image data such as facial recognition data, or some other type of biometric data such as fingerprints. Data can also be transmitted via short-distance radio from a transmitting unit in the possession of the user or embedded in the user's body. These can also be combined to obtain very robust personal identification information.

The identification information reading units 210*a*-210*f* send the acquired identification information to a server 10. The identification information can be sent to the server 10 from the gaming table 20 or identification information acquired by each identification information reading unit 210*a*-210*f* can be sent individually by the identification information reading units 210*a*-210*f* to the server 10. For example, identification information can be sent to the server 10 from a computer (not shown) used to manage information at a gaming table. In the explanation of the present embodiment, the identification information reading units 210 send identification information to the server 10.

When identification information is sent from a gaming table 20 to the server 10, the server 10 can combine the gaming table ID used to identify the gaming table with information used to identify the identification information reading unit 210 used to read the identification number and a sector ID used to identify the corresponding sector. The server 10 can then use these IDs to determine what sector and what gaming table are associated with identification information that has been received. The server 10 can also be configured to identify a gaming table and sector using the IP address or MAC address of the sender. Here, the IDs may be sent to the server 10 from the gaming table 20.

Description of the Display Unit

A display unit 220*a*-220*f* for displaying user credit is installed in each sector of the gaming table 20. When a user sits down in sector 1 and the user's identification card has been read by identification information reading unit 210*a*, the identification information reading unit 210*a* sends the read identification information to the server 10. Because the server 10 has stored credit associated with the identification information, the server 10 sends data on the credit associated with the sent identification information to the display unit in the same sector as the sender. Credit sent from the server 10 in this way is then displayed on a display unit at the gaming table.

In the explanation of the present embodiment, a display unit is provided in each sector. However, the present disclosure is not limited to this configuration. For example, a single display unit may be provided at a gaming table to display the credit available to all users participating in the game. The display units displaying the credit of each user may be arranged so as to be viewed by each individual user or may be arranged in overhead space above the table. Alternatively, the display units displaying the credit of each user can be arranged in front of the dealer.

Description of the Chip Reading Unit

The following is a description of the chip reading unit 240 provided in each sector. The chip reading unit 240 can read information on the chips from RFID installed in each chip and send the retrieved chip information to the server 10. The server 10 can identify the chip information present in each sector of each table in the manner described above with respect to identification information.

For example, the chips placed in a sector by the dealer D or a user can be three 10-dollar chips and five 1-dollar chips. In this case, the chip reading unit reads chip information indicating that there are three 10-dollar chips and five 1-dollar chips present in the sector. The information retrieved from each chip is sent to the server 10, and the server 10 performs calculations and determines that there are 35 dollars' worth of chips in the sector. Alternatively, the chip reading unit 240 may calculate the chip total and send the calculated chip total to the server instead of sending information on each chip.

In the following explanation, the chip reading unit in sector 2 of FIG. 2 is used as an example. However, the operations are performed in the same way in the other sectors. A chip reading unit 2 for reading chip information from chips is placed at a certain location in sector 2. Specifically, a bet chip reading unit (first chip reading unit) 240*a* for reading chips that have been bet and a payout chip reading unit (second chip reading unit) 240*b* for reading chips given out (paid out) by the dealer are provided. The bet chip reading unit 240*a* and the payout chip reading unit 240*b* have antennas for reading the RFID in each chip. In this example, the configuration has been divided into a bet chip reading unit 240*a* and a payout chip reading unit 240*b*. However, the chip reading unit does not have to be divided in this way and a single chip reading unit can be installed in each sector. In the explanation of the present embodiment, an RFID is embedded in each chip. However, the present disclosure is not limited to this example. Any configuration able to allow the server to grasp the face value of the chips in each sector may be used.

The chip reading unit shown in FIG. 2 is merely an example of a chip reading unit that can be used at the gaming table shown in FIG. 2. The gaming table in FIG. 2 is assumed to be a baccarat table, but baccarat is just one example of different types of gaming tables with different configurations. The bet chip reading unit and the payout chip reading unit can be installed at different positions depending on the gaming table on which they are used.

Description of the Card Shoe

A card shoe 230 is also arranged on the gaming table. A card shoe is a case used to store playing cards used in a game. The dealer takes playing cards used in a game from the card shoe one at a time and arranges them in certain locations on the table. In the present embodiment, a card reading unit 231 is provided in the card shoe 230. For example, the card reading unit 231 can recognize the pattern on each card using a line scanner and identify the type of card placed in a given area based on the recognition results (the suit and number of the card such as "two of spades"). Alternatively, the card reading unit 231 can read the RFID embedded in each playing card. The card reading unit 231 can also identify the type of card arranged in a given area based on data included in the retrieved RFID. The card reading unit 231 may also have an imaging unit for imaging playing cards. The card reading unit 231 may identify the type of card arranged in a given area based on an analysis of the image data obtained by the imaging unit. Alternatively, the card reading unit 231 can use a configuration able to identify the type of card by reading a code recorded on the card. Card information indicating the identified type of card is sent from the card reading unit 231 to the sever 10.

In this way, the card reading unit 231 can identify the distribution of cards to the banker and the player in baccarat for the server 10 by reading the cards placed at certain locations on the table. In baccarat, the dealer D clearly defines whether a card has been dealt or not according to certain rules so there is no way that the dealer's or user's intentions can interfere. Therefore, the server 10 can determine the results of the game based on card information sent from the card reading unit 231 which reads the cards in the order they are removed from the shoe. In this example, the server 10 determines the result of the games. However, the results of the game can be determined by a computer (not shown) provided at the gaming table and the results can be sent to the server 10.

In this way, the server 10 determines whether the banker or the player has won a game or whether the game is a tie based on the card information. In other words, it can acquire information indicating the progress of the game (referred to below as "progress information").

In this explanation, the card information is obtained by a card reading unit 231. However, there are no particular restrictions on the configuration used to allow the server 10 to acquire progress information. For example, the gaming table can be monitored using a surveillance camera, and the server 10 can acquire progress information from a game based on images taken by the camera. Alternatively, progress information can be acquired by the server 10 using result data entered by the dealer or a member of the casino staff. A combination of methods can also be used. The progress information can also include information on the situation at the gaming table while the game is in progress, during both the betting phase and the payout phase.

Server Configuration

Figure 3:
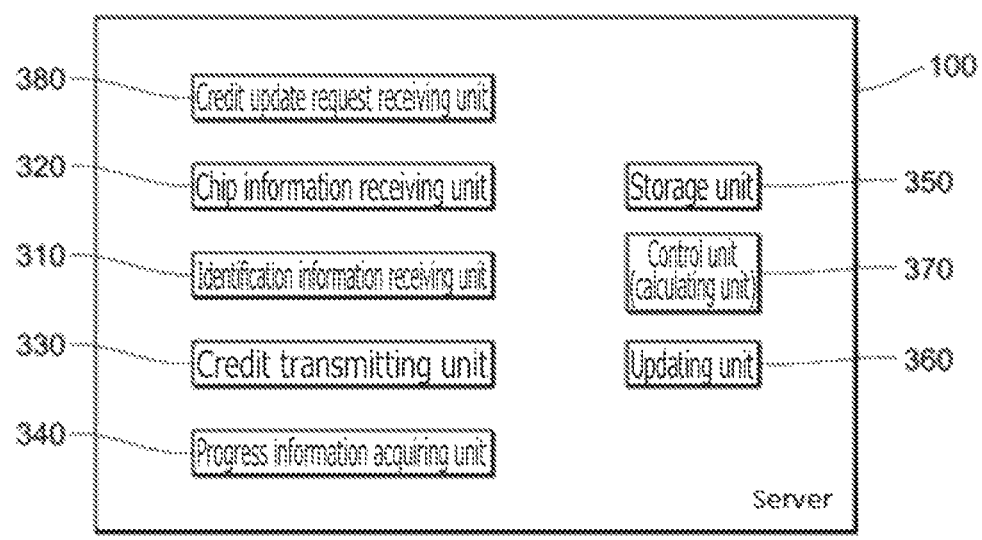
FIG. 3 is a diagram showing an example of a configuration for the server in the embodiment.

The following is a description of a specific configuration for the server. FIG. 3 is a block diagram showing an example of a specific configuration for the server 10. The server 10 has an identification information receiving unit 310, a chip information receiving unit 320, a credit transmitting unit 330, a progress information acquiring unit 340, a storage unit 350, an updating unit 360, a control unit 370, and a credit update request receiving unit 380. Among the components shown in FIG. 3, the CPU 11 temporarily deploys software stored in the ROM 12 or on the hard drive 14 in the RAM 13, and performs processing in accordance with the deployed program. In this way, the CPU 11 controls the functions of each component shown in FIG. 3. The identification information receiving unit 310, chip information receiving unit 320, credit transmitting unit 330, progress information acquiring unit 340, and credit update request receiving unit 380 work together with the CPU 11 and the communication interface 15 to perform their functions. The storage unit 350 and the updating unit 360 work with the CPU 11 and the hard disk 14 to perform their functions. In the present embodiment, the configuration of the server is explained as processing performed according to software. However, the processing may also be performed by dedicated hardware or by a combination of hardware and software.

The storage unit 350 contains the credit management database. The credit management database, as mentioned above, is a database in which user credit is associated with unit identification information and stored. FIG. 4 is a table showing an example of a credit management database stored in the storage unit.

When a user's identification card is present at the window to add credit, the following processing is performed. At the window, identification information is read from the identification card presented by the user. The cashier device 31 at the window sends a credit update request comprising the added credit sum to the server 10. When the credit update request has been received by the update request receiving unit 308 at the server 10, the control unit 370 controls the updating unit 360 to update the credit management database stored in the storage unit 350. Specifically, the credit included in the update request is added to the credit corresponding to the identification information subject to the update. In this way, credit is charged and the credit stored in the storage unit 350 is updated.

In this explanation, credit was charged by the cashier device 31 at the window. However, when the user presents an identification card at the window for a payout, the same process is performed except credit is subtracted instead of adding credit.

The storage unit 350 also comprises a progress management database. FIG. 5 is a table showing an example of a progress management database. The progress management database comprises a table ID column identifying the gaming table, a column identifying the sector of the gaming table, a column indicating the identification information for the user participating in the game, a column recording the bet sum, a column indicating the betting destination, and a column indicating the sum to be updated. The following processing uses the progress management database.

The identification information receiving unit 310 receives identification information sent by the identification information reading units 210 at each gaming table. The control unit 370 searches the credit management database stored in the storage unit 350 using the identification information received by the identification information receiving unit 310 as a key. The control unit 370 then sends the credit associated with the identification information stored in the storage unit 350 to the gaming table that sent the identification information using the credit transmitting unit 330.

The progress information acquiring unit 340 acquires progress information. For example, the progress information can include the results of a game played at a table and the game status (whether the game is still being played and is in the betting phase or the payout phase, etc.)

The updating unit 360 under the control of the control unit 370 updates the table stored in the storage unit 350. For example, the updating unit 360 updates the credit managed by the credit management database shown in FIG. 4 based on the credit update request (additional credit request) received by the credit update request receiving unit 380. The updating unit 360 updates the progress management database shown in FIG. 5 or the credit management database shown in FIG. 4 based on information received from the identification information receiving unit 310, the chip information receiving unit 320, and the progress information acquiring unit 340. The details are explained below.

Game Participation Sequence

In the following explanation of the processing performed in each scene, it is assumed that a user has taken a seat at the table to participate in the game. In this explanation, all credit associated with the identification card has already been registered in the credit management database.

Figure 6:
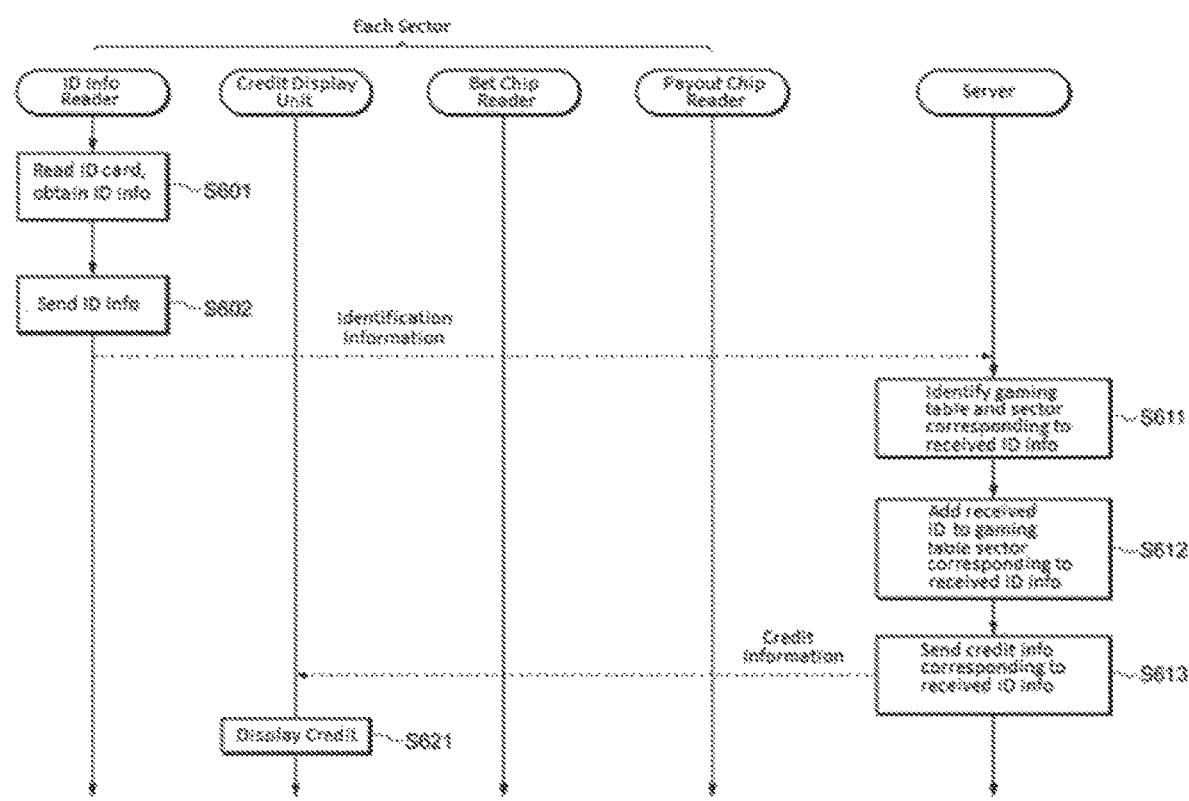
FIG. 6 is a diagram showing an example of the processing sequence when a user joins a game in the embodiment.

FIG. 6 is a diagram showing an example of the processing sequence when a user has taken a seat at a certain sector in the gaming table to participate in a game and the identification card has been read by the identification information reading unit 210. More specifically, this is an example of the initial processing performed when a user participates in a game. In this explanation, the user is seated at sector 2 in FIG. 2.

In Step S601, the identification information reading unit 210*b* reads the identification card to obtain the identification information. In Step S602, the identification information reading unit 210*b* sends the identification information to the server 10.

When the identification information receiving unit 310 at the server 10 has received the identification information, in Step S611, the control unit 370 identifies the gaming table and sector from which the identification information was sent based on the IP address of the sender.

In Step S612, the control unit 370 controls the updating unit 360 to update a progress management database such as the one shown in FIG. 5. Specifically, the updating unit 360 adds the identification information received by the identification information receiving unit 310 to the identification information column of the progress management database corresponding the gaming table and sector identified in Step S611. For example, the user possessing the identification card with identification information U1032 is seated in sector 2 of the table identified by table ID T11. When identification information has been retrieved by the identification information reading unit 210, the updating unit 360 writes the identification information to the corresponding position in the progress management database in accordance with the processing described above. In this way, the control unit 370 determines that the user identified by U1032 is seated in sector 2 of the table identified by table ID T11 in order to participate in a game.

Next, the explanation continues with reference to the processing sequence in FIG. 6. In Step S613, the control unit 370 searches the credit database shown in FIG. 4 stored in the storage unit 350 using the received identification information as a key. Then, the control unit 370 sends the credit associated with the matching identification information in the search results to the gaming table using the credit transmitting unit 330. Specifically, the credit transmitting unit 330 sends the credit to the display unit corresponding to the sector of the gaming table identified in Step S611.

In Step S621, the display unit that has received the credit displays the credit.

By performing the processing described above, a user wishing to participate in a game has his or her own credit (personal credit) displayed on the corresponding display unit once his or her identification information has been read by the identification information reading unit at his or her sector of the gaming table.

Processing Sequence when the Dealer Distributes Chips

The following is an explanation of the processing sequence performed when chips are distributed by the dealer. The dealer distributes chips when (1) a user first sits down at the table to participate in a game, (2) when the user is finished with a game and wishes to exchange chips (for example, exchange smaller denomination chips for larger denomination chips), and (3) when the dealer distributes chips to a user as the result of a game such as a game that the user has won. Case (3) will be explained below under a separate heading. Here, the explanation will focus on case (1) and case (2).

When a user first sits down at the table to participate in a game, chips are distributed by the dealer. Specifically, continuing the processing shown in FIG. 6, chips are distributed by the dealer. Here, the dealer distributes chips corresponding to the credit displayed on the display unit to the user. Chips do not have to be distributed to a user who has already played a game at another table and has chips.

When the dealer distributes chips to the user, the chips are distributed by hand and a mistake may be made as explained above. In the present embodiment, when chips are distributed by the dealer, the control unit 370 determines whether the sum of the chips distributed by the dealer matches the credit stored by the server 10. When there is no match, an error is outputted.

Figure 7:
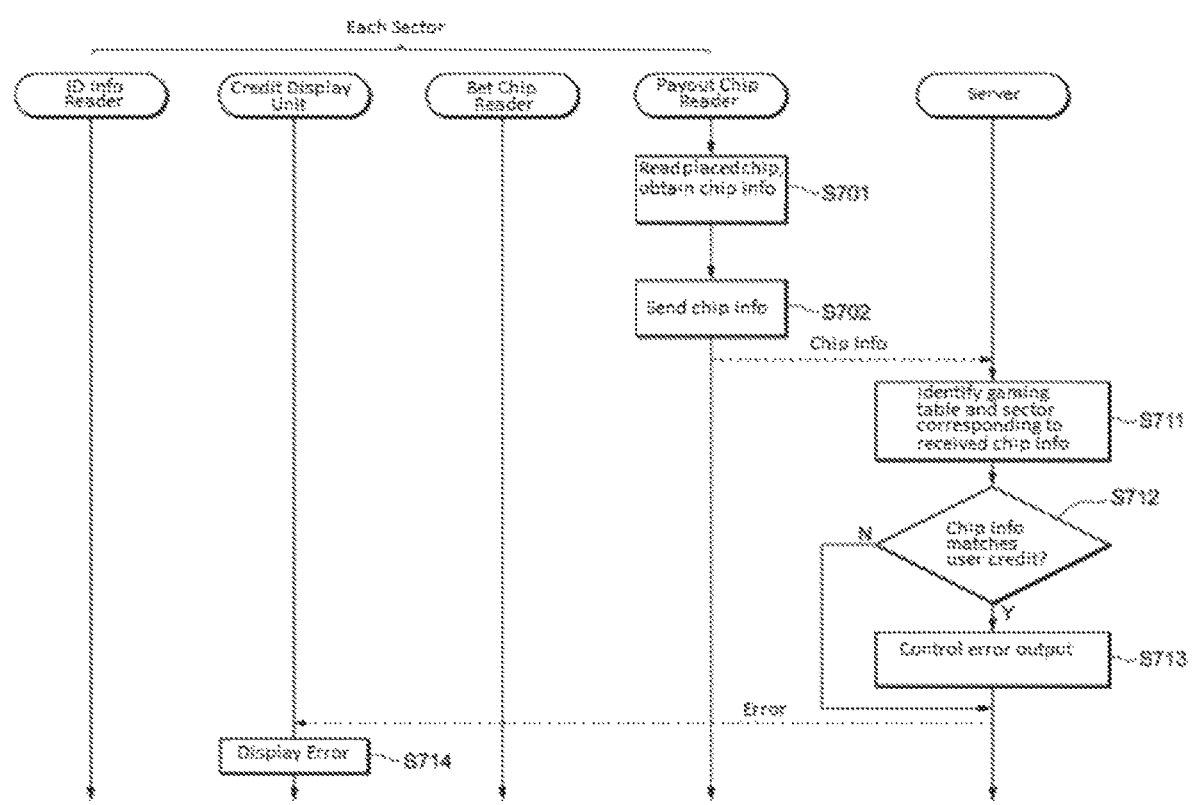
FIG. 7 is a diagram showing an example of the processing sequence when a dealer distributes chips in the embodiment.

FIG. 7 is a diagram showing an example of the processing sequence performed when chips are distributed by the dealer. A user sits down at the table to participate in a game, and the dealer distributes the credit displayed on the display unit 220*b* to the user whose identification card has been read by the identification information reading unit 210*b*. Specifically, the dealer places chips corresponding to the credit displayed on the display unit 220*b* in an area readable by the payout chip reading unit 240*b* in sector 2 where the user is seated. In Step S701, the payout reading unit 240*b* reads the chips present in the readable area to obtain chip information. In Step S702, the payout chip reading unit 240*b* sends the chip information to the server 10.

In Step S711, the control unit 370 in the server 10 identifies the gaming table and sector of the sender using a technique similar to the one explained above with reference to Step S611 in FIG. 6. When the gaming table and sector have been identified, the control unit 370 references the progress management database shown in FIG. 5 to identify the identification information of the user participating the game in that sector. The control unit 370 then references the credit management database shown in FIG. 4 to extract the credit associated with this identification information.

In Step S712, the control unit 370 in the server 10 compares the extracted credit to the sent chip information to determine whether the sums match. For example, when the sum of the credit stored in the storage unit 350 of the server 10 is 100 dollars and the sum of the chips distributed by the dealer is 150 dollars, the control unit 370 determines that this does not match the sum indicated by the chip information read by the payout chip reading unit 240*b*.

When the control unit 370 determines that the sums do not match in Step S712, the control unit 370 outputs an error in Step S713. When the control unit 370 determines that the sums match in Step S712, the processing in Step S713 is skipped.

An example of an error output by the control unit 370 in Step S712 is to display an error in the display unit 220*b* corresponding to sector 2 of the gaming table. However, error outputs are not limited to this example and many different embodiments are possible. For example, a warning light can be installed in each sector of the gaming table and the control unit 370 can output signals to turn these warning lights on and off. Alternatively, a speaker can be installed at the gaming table and the control unit 370 can output control signals to generate an audio warning. An error message can also be sent to the mobile phone of the manager of the gaming establishment.

In the example explained with reference to FIG. 7, a user has first sat down at a table to participate in a game. However, the user may also request an exchange of chips with the dealer. In some cases, the user may place his or her own chips on the table without any chips being distributed by the dealer. For example, a user may have left another gaming table at the end of a game and placed his or her own chips on the table in the payout zone. In these cases, the payout chip reading unit 240*b* reads chip information on the chips present in the readable area and performs processing similar to that described above.

Processing Sequence when Users Place Bets

Figure 8:
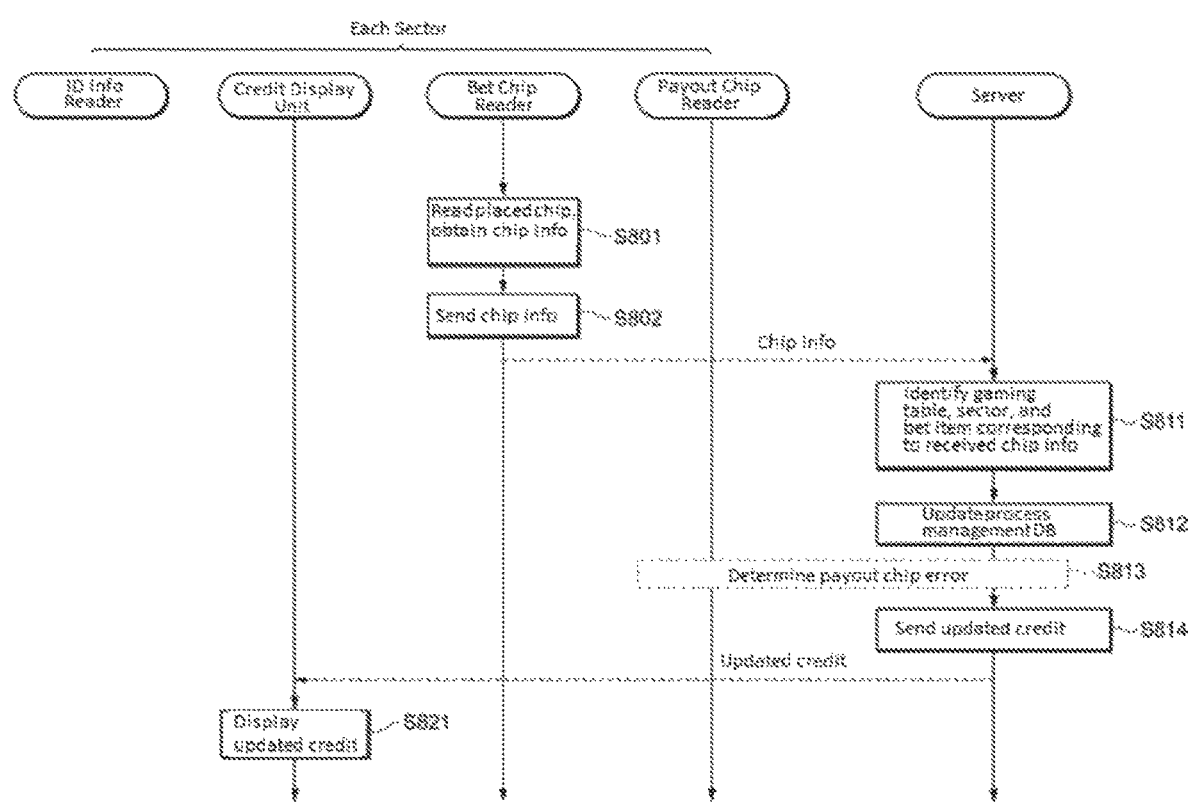
FIG. 8 is a diagram showing an example of the processing sequence when a user wishing to join a game places a bet in the embodiment.

The following is an example of the processing sequence that is performed when a user participating in a game places a bet. FIG. 8 is a diagram showing an example of the processing sequence performed when a user participating in a game places a bet.

When a user is participating in a game of baccarat, he or she anticipates the result of the game. Then, as shown in FIG. 2, the user places chips in the area corresponding to the prediction (player, banker and tie in FIG. 2) in the sector where the user is seated. When the user has placed chips in the area corresponding to a prediction, this is called placing a bet. The amount indicated by the type and number of chips placed in this area is the total bet placed by the user.

In Step S801, the bet chip reading unit 240*a* reads the chips present in the readable area to obtain chip information. For example, when two 10-dollar chips and one 5-dollar chip are present, the chip information indicates that the total bet is 25 dollars. Next, in Step S802, the bet chip reading unit 240*a* sends the chip information obtained in Step S801 to the server. In the example explained here, the bet chip reading unit 240*a* sends chip information indicating the chip total to the server 10. However, the present disclosure is not limited to this example. For example, the bet chip reading unit 240*a* may send chip information indicating the type and number of chips to the server and the server can calculate the chip total.

The chip information may include information on the prediction area where the chips have been placed (player, banker or tie in FIG. 2). For example, the bet chip reading unit 240*a* can read the chips in sub-areas created by dividing the readable area, and the information indicated by these sub-areas can be send along with the chip information. The embodiment explained here is merely an example, and the server 10 can identify any type of bet placed in any type of area by a user.

In Step S811, the control unit 370 in the server 10 identifies the gaming table and the sector of the sender in the same manner as the processing explained above with reference to FIG. 6 and FIG. 7. The control unit 370 also identifies the prediction on which the user has placed a bet in the same manner as above.

In Step S812, the control unit 370 in the server 10 controls the updating unit 360 to update the progress management database stored in the storage unit 350. The details of the processing performed in Step S812 are explained in detail below.

In Step S813, the server 10 determines whether an error has occurred when the chip information was sent from the payout chip reading unit. This processing is optional. When chip information has not been sent from the payout chip reading unit, the server 10 does not perform error processing. For example, when the result goes against the user's prediction, the bet chips are recovered by the dealer and no chips are paid out by the dealer. Also, when the user wins a bet, chips recovered by the user may be used to place another bet. Therefore, the processing in Step S813 is performed when the user wins a bet and chips paid out by the dealer are in the possession of the user.

Figure 9:
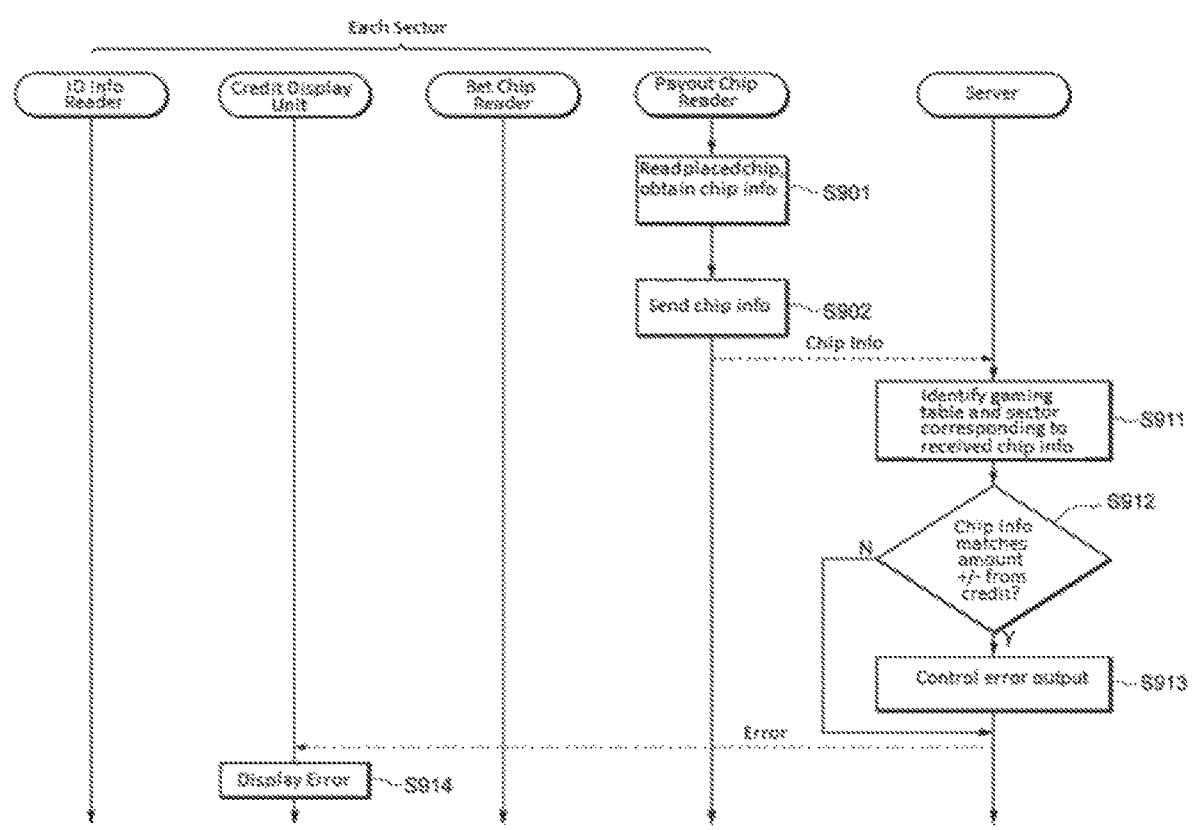
FIG. 9 is a diagram showing another example of the processing sequence when a dealer distributes chips in the embodiment.

FIG. 9 is a diagram used to explain the processing performed in Step S813 in greater detail. The processing in FIG. 9 is basically same as the processing explained with reference to FIG. 7, and only the processing in Step S912 is different from the processing explained above with reference to FIG. 7. Specifically, the processing in Steps S901, S902, S911, S913 and S914 can be the same as the processing in Steps S701, S702, S711, S713 and S714.

In Step S912, the control unit 370 determines whether or not the sum indicated by the chip information sent from the payout chip reading unit matches the sum to be added to or subtracted from the credit. For example, the bet chips may have been worth 20 dollars and the user may be paid 40 dollars' worth of chips for a winning bet. Here, (1) credit is added or subtracted once the result of a game has been determined or (2) the sum of the bet chips is subtracted before the results of the game are known, that is, credit is temporarily subtracted when a bet is placed. In the case of method (1), the processing in Step S812 of FIG. 8 is performed to add 20 dollars' worth of chips to the user's credit. In the case of method (2), the processing adds 40 dollars' worth of chips to the user's credit. In the example explained below, credit is added or subtracted once the results of a game are known.

When the result from Step S912 is that the sum indicated by the chip information sent from the payout chip reading unit does not match 20 dollars, the control unit 370 advances to Step S913 and outputs an error.

The following is a continuation of the explanation of the processing in FIG. 8. In Step S814, the control unit 370 updates the credit managed in the credit management database so that the amount to be added to or subtracted from the credit as calculated in the progress management database in Step S812 is reflected in the user's credit. The updated credit is then sent to the display unit 220*b*. Once received, the display unit 220*b* displays the updated credit in Step S821.

When this processing is performed, credit is properly updated in response to the results of a game.

In the example explained here, error processing is performed each time chips are paid out by the dealer. However, the present disclosure is not limited to this example. For example, the error processing can be omitted until the user leaves his or her seat at the table, that is, while the user is still playing the game. Here, the error processing is performed only in the situation shown in FIG. 7, that is, only when the user finishes playing a game and leaves the table. When the user leaves the table, a button (not shown) is pressed at the gaming table by the user or the dealer to notify the server that the user had left the table. Alternatively, the identification information reading unit may notify the server that the user has left the table when the user removes his or her identification card.

Updating the Progress Management Database in Response to Progress Information

Figure 10:
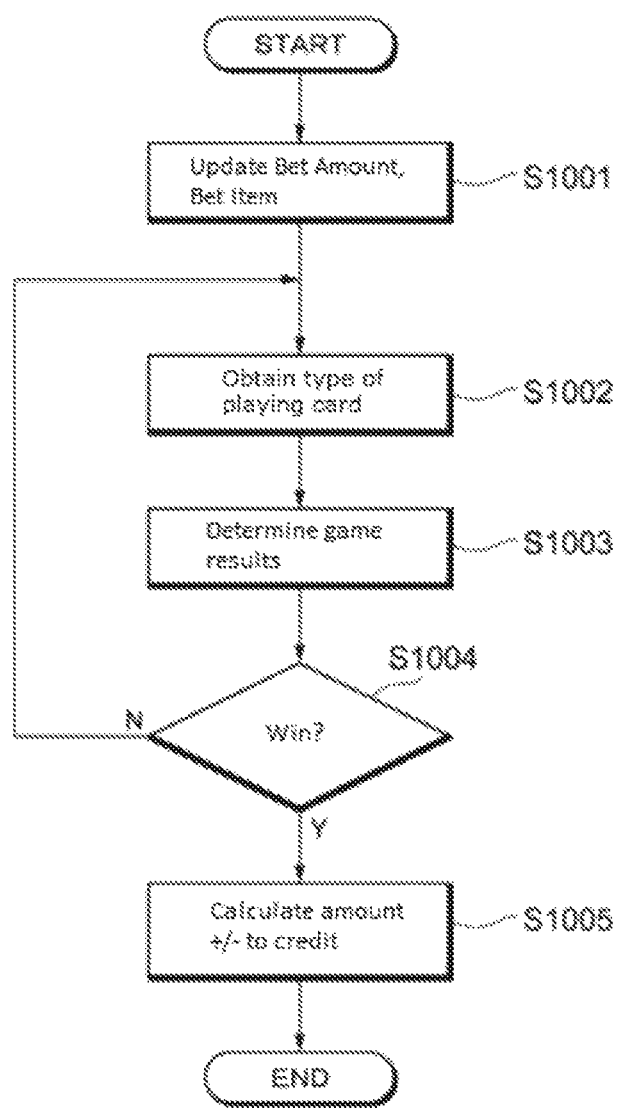
FIG. 10 is a flowchart showing an example of the updating process for the progress management database in the embodiment.

The following is an explanation with reference to FIG. 10 of the update processing performed by the server on the progress management database in Step S812. As mentioned above, progress information is information indicating the status of a game such as the results of a game.

FIG. 10 is a flowchart showing an example of updating processing performed on the progress management database by the server 10.

In Step S1001, the control unit 370, for example, updates the bet amount and bet destination in the progress management database shown in FIG. 5. The control unit 370, for example, can update the bet amount and bet destination in the columns identified by the identification processing in Step S811 of FIG. 8.

In Step S1002, the progress information acquiring unit 340 acquires card information from the playing card distributed by the dealer. For example, card information identifying the type of playing card, such as the ace of spades, is obtained.

In Step S1003, the control unit 370 determines the game result based on the card information on the playing card obtained in Step S1002. When it has been determined from the results that the user has won or lost, the process advances from Step S1004 to Step S1005. When it cannot be determined whether the user has won or lost, the process returns to Step S1002 and card information on the next playing card dealt by the dealer is obtained.

As explained above, in baccarat, the dealer clearly defines whether or not a card has been dealt to the banker or the player in response to game conditions and in accordance with certain rules so there is no way that the intentions of the dealer or user playing the game affect the card that is dealt. Therefore, cards are taken in order from the card shoe, the cards are read in order by the card reading unit, and the type of playing card dealt is continuously being identified so that the control unit 370 can determine the results of the game.

In Step S1005, the control unit 370 calculates the amount to be added to or subtracted from the user's credit based on the results of the game. For example, the player is presumed to have won in the progress management database shown in FIG. 5 (where the "amount to be updated" has not yet been updated). In the "amount to be updated" column of the progress management database in FIG. 5, the amount to be added when the player has won is calculated by the control unit 370 and updated accordingly by the updating unit 360. Specifically, the amount to be updated for users who bet on the "player" is the amount bet, the amount to be updated for users who bet on the "banker" is minus the amount bet, and the amount to be updated for uses who bet on a "tie" is 0.

Therefore, for example, 20 dollars' worth of chips are played out by the dealer to the user in sector 2. At this time, as explained with reference to FIG. 9, it is determined whether the amount indicated by the chip information corresponding to 20 dollars' worth of chips paid out matches the amount to be updated recorded in the progress management database shown in FIG. 5.

Then, as explained in Step S814 of FIG. 8, the updating unit 360 updates the credit corresponding to the identification information for the user in sector 2 recorded in the credit management database so that the value recorded in the "amount to be updated" column of the progress management database is reflected in the credit recorded in the credit management database. Next, as explained above in Step S814 of FIG. 8, the updated credit is sent to the display unit and displayed.

In a gaming establishment, the user often bets chips distributed by the dealer immediately. In other words, the paid-out chips are placed under the payout chip reading unit 240b and then placed by the user immediately under the bet chip reading unit 240a. In this case, the processing performed is the same as the processing explained above.

Effect of Embodiment

In the present embodiment, as explained above, monetary value is removed from chips and stored in the storage unit 350 of the server 10. However, chips are exchanged between the dealer and users in the same manner as before. Therefore, users can continue to experience the same thrill from participating in games at a casino. Because user credit is managed by a server, errors are outputted when too many chips are handed out due to dealer mistakes or inadvertent actions. In this case, mistakes can be quickly noticed and corrected.

In the explanation of the present embodiment, identification cards were used to participate in games. By using identification cards to participate in games, users visiting a casino can be managed. For example, information on visiting users can be better managed by entering various combinations of personal information when an identification card is created, for example, the frequency of visits, gaming preferences, and credit. By managing the personal information of users, user addiction to gaming can also be prevented.

Other Embodiments

In the embodiment explained above, the bet chip reading unit and the payout chip reading unit were separate devices. However, this can be grasped by the server based on the game status, whether the game is in the betting phase or the reimbursement (payout) phase. Therefore, the control unit 370 can determine whether sent chip information is chip information related to bet chips or chip information related to paid out chips based on chip information received by the chip information receiving unit 320 and progress information received by the progress information acquiring unit 340.

Also, baccarat was the game used as an example in the embodiment explained above. However, the present disclosure is not limited to this example. For example, a common card game played at casinos is blackjack. In blackjack, unlike baccarat, the results of the game change depending on the intentions of the user. For example, it is up to the user himself or herself whether to add another playing card (hit) or not (stay or stand). Therefore, in blackjack, playing cards dealt from the card shoe are not read and the results of the game are determined by reading images of the cards on the table or by embedding RFID in the cards themselves to determine which cards have been dealt to which user.

Sometimes, chips (tips) are given out by users at casinos as a form of thanks. In order to differentiate these from chips used in a game, chips used as a form of thanks are described as tips. For example, when a drink is received from a hostess going around a table handing out drinks, a chip may be handed to her as a form of thanks. When a user wins a game, it is also customary for the user to "tip" the dealer. Handing out tips is part of the thrill of using chips at a casino. In the embodiment explained above, an error is outputted when the credit stored in the storage unit 350 of the server 10 does not match the chops possessed by a user from games. Therefore, an error is outputted when tips are handed out to hostesses and dealers in the form of chips.

When a reading unit is provided to read chips used as tips and chips are read by this reading unit, the amount can be subtracted from user credit. In this process, if the user places a chip in the reading unit for tips before handing out the chip as a tip to a hostess or to a dealer, a mismatch does not occur with the sum stored in the storage unit 350 of the server 10, and an error is kept from being outputted.

In the embodiment explained above, a card game at a gaming table was used as the example. However, the present disclosure can also be applied to table games such as roulette. In roulette, users participating in the game place bets in a common area. Therefore, chips used to place bets should incorporate information identifying the participating user in the chip information so that each user can be identified.

In the embodiment explained above, identification information was recorded on an identification card, credit associated with this identification information was stored by the server, and this credit was updated. However, the present disclosure is not limited to this example. For example, credit can be stored in the identification card itself, and credit can be recorded on the identification card itself using an identification information reading unit provided at the gaming table to read and write information to and from the identification card. This can be used to prevent mistaken distribution of chips by dealers. Individual management of users can be performed in the same way by the server.

In the embodiment explained above, a credit management database and a progress management database were used as examples of managing information in data table format. However, the present disclosure is not limited to this example. Information can be stored in any format.

Also, identification cards can be used in devices that already manage credit electronically such as slot machines. In other words, when a slot machine reads a user identification card, the credit stored on the server 10 can be recorded as the amount of credit available for use in the slot machine.

Also, the server 10 described in the aforementioned embodiment may be configured so that the processes performed by each of the units shown in FIG. 3 is distributed across a plurality of devices. The programming code used to execute the functions in the aforementioned embodiment may also be executed by a single computer (CPU, MPU). This may alternatively be executed by a plurality of computers working together. The programming code may be in a form executed by a computer. Hardware such as circuits may also be provided to execute the functions of the programming code. Some of the programming code may be executed by hardware with the rest being executed by a computer.

The present disclosure may also be realized by supplying software (a program) for executing the functions in the aforementioned embodiment to a system or device via a network or storage medium, where the program is retrieved by a computer (or CPU or MPU) in the system or device and executed.

The invention claimed is:

1. A management system comprising:
a server for managing user credits electronically apart from the chips;
an identification information reading unit for reading user identification information and sending the user identification information to the server; and
a chip reading unit for reading chip information on chips present in a predetermined sector and sending the chip information to the server, wherein the chips incorporate information identifying the user in the chip information so that each user can be identified;
the server including:
a memory unit for storing user credit associated with unique identification information, and
a control unit that, in response to the server receiving a notification that the user has left a gaming table, performs error output controls when a sum indicated in the credit information does not match a sum to be added to or subtracted from credit associated with the identification information and stored.

2. The management system according to claim 1, wherein the server comprises:
an acquiring unit for acquiring progress information including the results from games that have been played, and
a calculating unit for calculating the sum to be added to or subtracted from the credit based on the chip information and acquired progress information.

3. The management system according to claim 2, wherein the chip reading unit comprises at least a first chip reading unit for sending the chip information on chips present in a first area of the predetermined sector to the server, and a second chip reading unit for sending the chip information on chips present in a second area of the predetermined sector different from the first area to the server;
the calculating unit calculates the amount to be added to or subtracted based on game results using the sum indicated by the chip information sent from the first chip reading unit as the bet sum; and
the control unit performs the error output controls when the sum indicated by the chip information sent from the second chip reading unit does not match the calculated sum.

4. The management system according to claim 2, wherein the calculating unit calculates the sum to be added or subtracted based on the game results using the sum indicated by the chip information as the bet sum while the acquired progress information is in a betting period.

5. The management system according to claim 4, wherein the calculating unit performs the error output controls when the sum indicated by the chip information does not match the updated sum while the progress information acquired by the acquiring unit is in a payout period.

6. The management system according to claim 2, further comprising an updating unit for updating the credit by reflecting the calculated sum in the credit.

7. The management system according to claim 2, further comprising a card information reading unit for reading card information on a playing card used in the game and sending the card information to the server,
the server determining the progress information based on the sent card information.

8. The management system according to claim 1, further comprising a display unit for displaying the credit.

9. A gaming table configured to communicate with a server for managing user credit electronically apart from the chips, the gaming table comprising:

an identification information reading unit for reading user identification information, sending the user identification information to the server, and notifying the server that the user has left the table; and a chip reading unit for reading chip information on chips present in a predetermined sector and sending the chip information to the server, wherein the chips incorporate information identifying the user in the chip information so that each user can be identified;

an output unit for outputting an error when the server is notified that the user has left the gaming table and a sum indicated by the chip information does not match a sum added to or subtracted from credit associated with the identification information sent by the identification information reading unit and stored by the server.

10. A management system comprising:

a server for managing user credits electronically apart from the chips;

an identification information reading unit for reading user identification information and sending the user identification information to the server; and a chip reading unit for reading chip information on chips present in a predetermined sector and sending the chip information to the server, wherein the chips incorporate information identifying the user in the chip information so that each user can be identified;

the server including:

a memory unit for storing user credit associated with unique identification information, an acquiring unit for acquiring progress information including the results from games that have been played, an updating unit for updating credit associated with the identification information based on the chip information and the acquired progress information, and a control unit that, in response to the server receiving a notification that the user has left a gaming table, performs error output controls when a sum indicated in the credit information does not match the updated credit.

* * * * *